April 14, 1953
J. W. MERZ
2,634,519
BULLDOZER ATTACHMENT FOR TRACTORS
Filed March 14, 1949
4 Sheets-Sheet 1
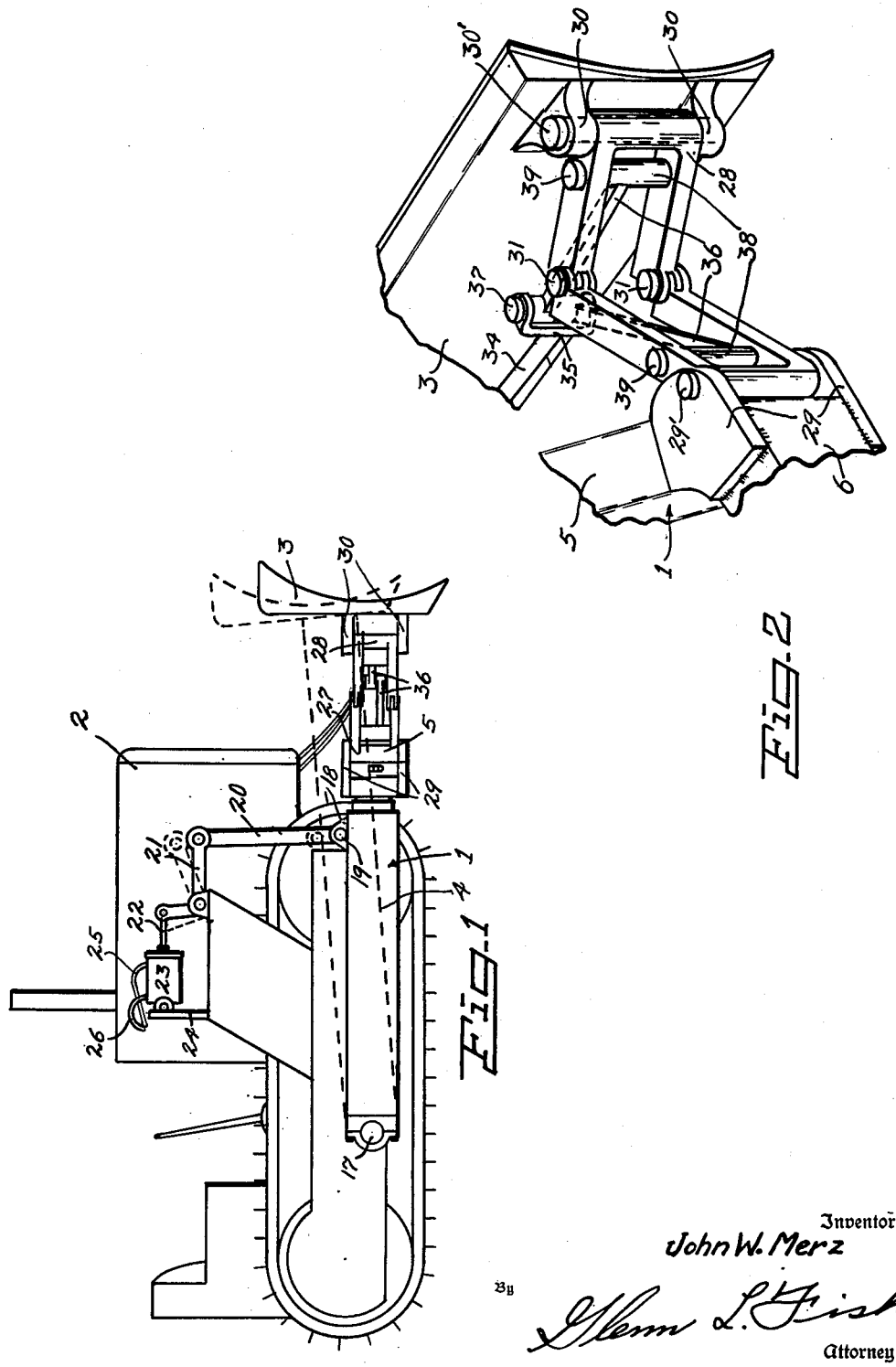
Inventor
John W. Merz
By
Glenn L. Fish
Attorney April 14, 1953 J. W. MERZ 2,634,519
BULLDOZER ATTACHMENT FOR TRACTORS
Filed March 14, 1949 4 Sheets-Sheet 2

Inventor
John W. Merz
By
Glenn S. Fish
Attorney

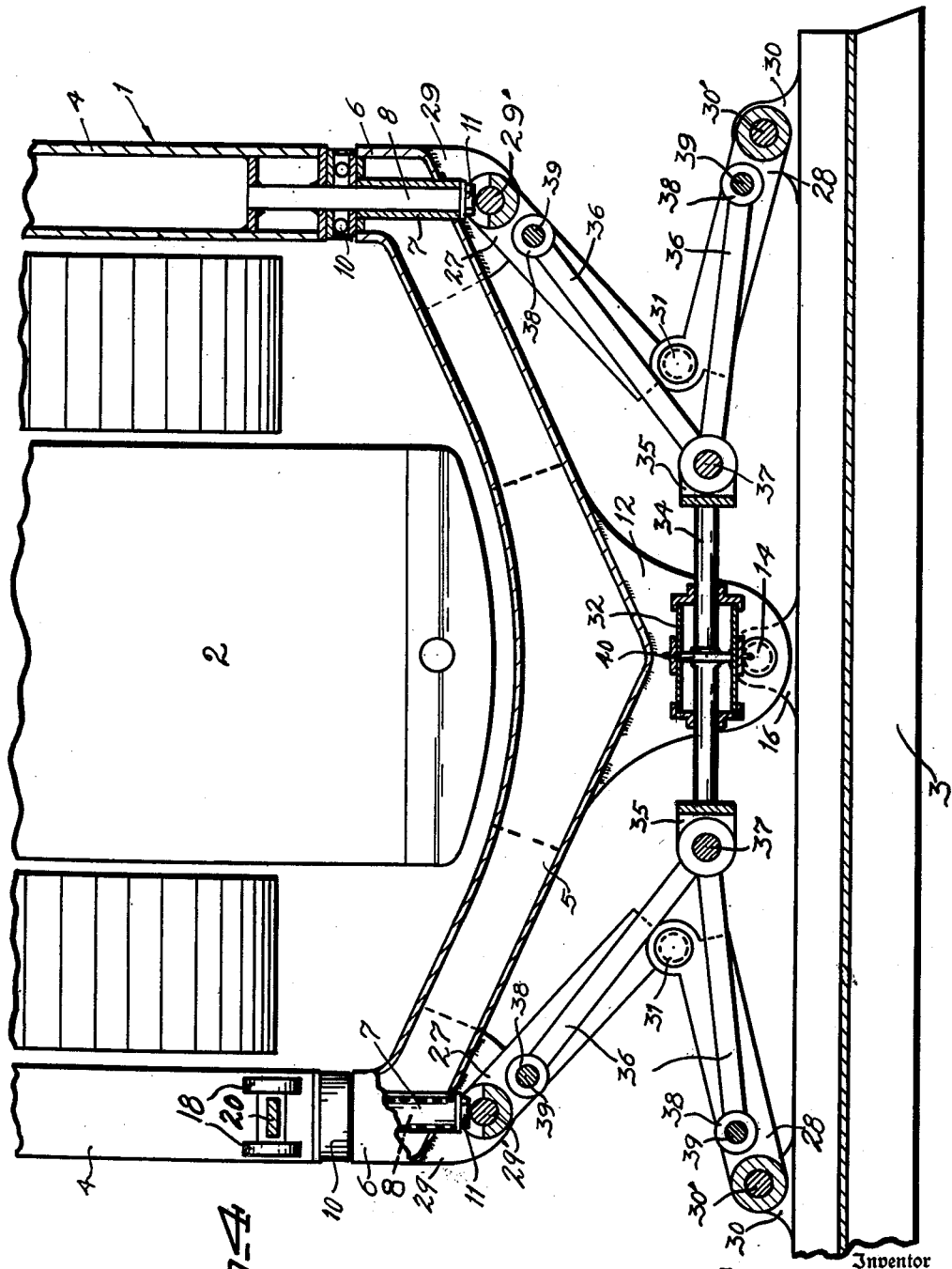

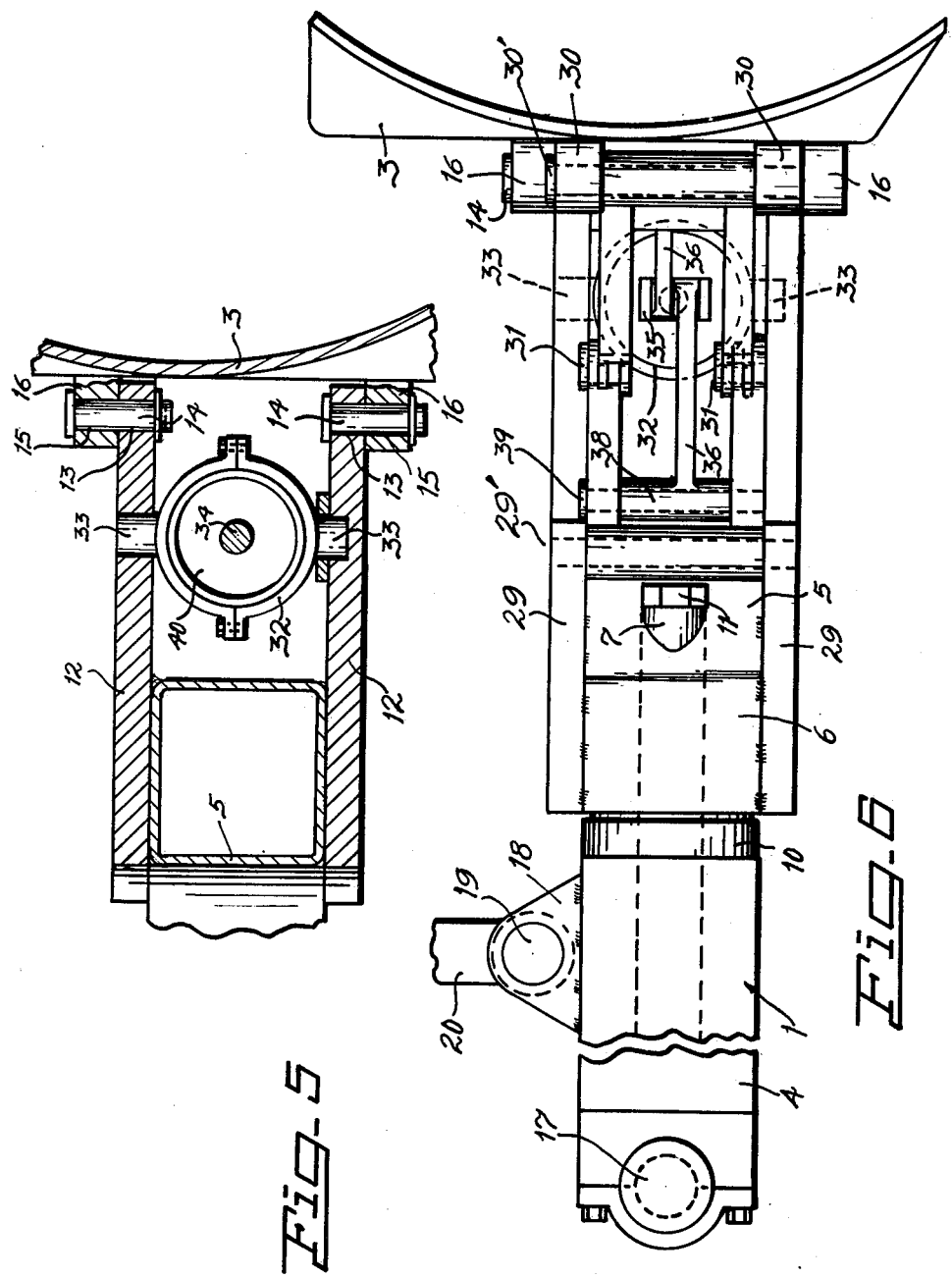

Patented Apr. 14, 1953

2,634,519

UNITED STATES PATENT OFFICE 2,634,519

BULLDOZER ATTACHMENT FOR TRACTORS

John W. Merz, Belton, Mont.

Application March 14, 1949, Serial No. 81,245

3 Claims. (Cl. 37—144)

This invention relates to a bulldozer which constitutes an attachment for a tractor and it is one object of the invention to provide a bulldozer which may be applied to a tractor of conventional construction and have its blade disposed across the front of the tractor and operate upon ground in front of the tractor as the tractor moves forwardly.

Another object of the invention is to provide the bulldozer with a blade so connected with a frame which straddles the tractor that the blade may be tilted vertically and also have its ends shifted forwardly so that the blade may be angularly adjusted and caused to extend across the front of the tractor at a desired incline.

Another object of the invention is to provide a bulldozer carried by a frame which straddles a tractor and has its side arms pivotally mounted at opposite sides of the tractor, the arms of the frame being supported from bell crank levers pivoted to the tractor and moved to adjusted positions by hydraulic means so located that the operator of the tractor may actuate the hydraulic means without descending from the tractor.

Another object of the invention is to provide a bulldozer which is of simplified construction and may be very easily mounted upon a tractor and also easily removed when the tractor is to be used for other purposes.

The invention is illustrated in the accompanying drawings wherein:

Fig. 1 is a side elevation showing the improved bulldozer mounted upon a tractor.

Fig. 2 is a perspective view upon an enlarged scale showing the manner in which ends of the blades are mounted for horizontal movement transversely of the tractor.

Fig. 4 is a view similar to Figure 3 showing portions in horizontal section.

Fig. 5 is a fragmentary sectional view taken along the line 5—5 of Figure 3.

Fig. 6 is a side elevation of the bulldozer.

Figure 3:
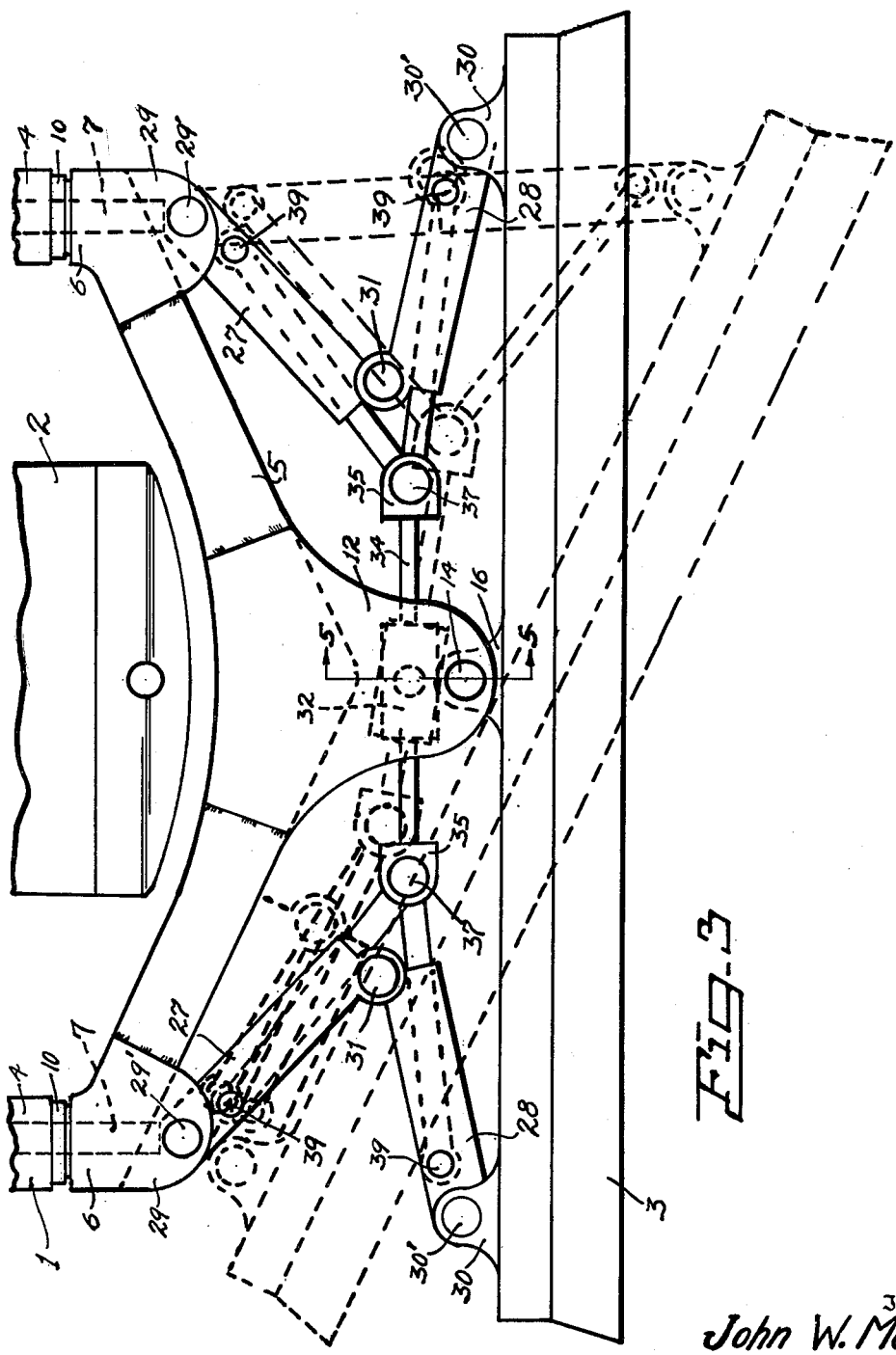
Fig. 3 is a top plan view of the blade and mechanism which adjustably connects the blade with the front end of the frame.

This improved bulldozer consists briefly of a frame 1 adapted to be mounted in straddling relation to the forward portion of a tractor 2 and a blade 3 extending transversely of the front end of the frame and pivotally connected therewith so that the blade may be moved horizontally to angularly adjusted positions.

The frame 1 has hollow side bars 4 and a hollow cross bar 5 having rearwardly directed ends 6 through which are mounted sleeves 7 extending longitudinally of the side bars and fitting about pins or stub shafts 8 which extend longitudinally of the side bars in axial relation thereto and have inner end portions welded to anchoring plates mounted in the side bars. Thrust bearings 10 are mounted about the pins between confronting ends of the side bars and the cross bar and nuts 11 which are applied to the threaded front ends of the pins hold ends of the cross bar upon the pins. By properly adjusting the nuts the ends of the cross bar will be allowed to turn about the pins and the cross bar may therefore have pivotal movement when the side bars are individually tilted or one side bar tilted upwardly while the other is tilted downwardly and the cross bar may be moved vertically from a horizontal position to a raised position, as indicated by dotted lines in Figure 1. Upper and lower plates or brackets 12 which are welded to the cross bar midway the length thereof project forwardly from the cross bar and at their front ends are formed with openings 13 to receive pivot pins 14 which also pass through openings 15 in ears 16 projecting rearwardly from the blade midway the length thereof one above the other. By so mounting the blade it may be moved horizontally about a vertical axis and swung in either direction to an angularly adjusted position, as indicated by dotted lines in Figure 3. The side bars of the frame 1 have their rear ends pivotally mounted about stub shafts or pivot pins 17 which project from opposite sides of the tractor and adjacent their front ends the side bars carry upwardly projecting ears 18 through which pass pins 19 by means of which the arms are pivotally connected with lower ends of links 20. These links have their upper ends pivotally connected with the horizontally extending arms of bell crank levers 21 mounted at opposite sides of the tractor and the vertical arms of these levers are connected with outer ends of piston rods 22 projecting forwardly from cylinders 23. The cylinders are pivoted to standards 24 and with front and rear end portions of each cylinder are connected tubes 25 and 26 so that liquid may be passed through the cylinders in the usual manner by the operator of the tractor and the pistons and their rods shifted longitudinally to effect vertical swinging movement of the arms 4 to adjusted positions. When both cylinders are energized and their pistons moved in the same direction the frame will be swung vertically from each side and raised or lowered in a horizontal position according to the direction in which the pistons are moved. Where only one cylinder is energized one side arm 4 of the frame will be shifted upwardly or downwardly and the blade tilted transversely of the frame in a vertical direction to an angularly adjusted position. It will thus be seen that the blade may be shifted vertically to adjusted positions and either held in a horizontal position or moved transversely of the tractor to angularly adjusted positions. The fact that the ends of the cross bar are pivotally connected with the side arms allows angular adjustment without distorting the side arms or the cross bar, and provision of the thrust bearings 10 allows movement of the cross bar to take place very easily.

In order to angularly adjust the blade and move it from the position shown in full lines in Figure 3 to a diagonally extending position, such as indicated by dotted lines in this figure, it must be moved about the pins 14. In order that this may be accomplished ends of the blade are connected with the frame 1 by yokes 27 and 28. The yokes 27 are pivotally mounted between bearing plates or brackets 29 welded to ends of the cross bar 5 by pins 29' and the yokes 28 are pivotally mounted between ears 30 by pins 30'. Arms of the companion yokes project towards each other and are pivotally connected by pins 31 thus forming hinge joints of the toggle type which allow the yokes to be swung from a position in which they are in end to end alignment with each other to an inwardly folded position. When the yokes are in the partially folded position shown in Figure 3 the blade will be held at right angles to the length of the tractor and push dirt straight ahead of the tractor. By swinging the yokes at one side of the frame outwardly towards the extended position and swinging the yokes at the other side of the frame inwardly in a folding direction the blade will have one end thrust forwardly and its other end drawn rearwardly and the blade will be moved about the pins 14 to an inclined position and as the tractor is moved forwardly dirt encountered by the blade will be pushed forwardly and at the same time slide along the blade towards the rear end thereof and pass from the blade at this rear end. A cylinder 32 extends transversely of the frame and is pivotally mounted between the plates 12 by pins 33. A piston rod 34 is slidable longitudinally through the cylinder and has its end portions projecting outwardly from opposite ends of the cylinder and carrying yokes 35. Front and rear arms or links 36 are pivotally connected with the yokes 35 by pins 37 and these links have their outer ends formed with vertically extending cross heads 38 which are of tubular formation and pivotally mounted between the arms of the yokes 28 by pins 39. A piston 40 surrounds the rod or shaft 34 midway the length thereof and is located within the cylinder 32, and when this piston is moved longitudinally of the cylinder by liquid fed to the cylinder by a suitable pump the rod will be shifted longitudinally to fold the yokes at one side of the frame and extend those at the other side of the frame and thereby cause the blade to be tilted about the vertically extending pins 14 to an angularly adjusted position. The mechanism for controlling flow of liquid to and from the cylinders will be of conventional construction and so located upon the tractor that the driver may readily reach the same without leaving the seat, but has not been shown as any conventionally constructed control mechanism may be used.

Having thus described the invention, what is claimed is:

1. A bulldozer attachment for a tractor comprising a frame of dimensions adapting it to straddle a tractor and having a cross bar for extending across the front end of the tractor and rearwardly extending side bars adapted to be pivoted at their rear ends to opposite sides of the tractor and mount the frame for vertical swinging movement to raised and lowered positions, means for swinging the frame vertically to adjusted positions, a blade extending transversely of the frame in advance of the front end of the frame and pivoted midway of its length to the cross bar midway of the width of the frame for adjustment about a vertical axis to angularly adjusted positions, companion yokes pivoted to ends of the cross bar and the blade and extending towards each other with their meeting ends pivoted to each other for movement from a folded position to an extended position in alignment with each other to limit movement of the blade about its vertical axis, a mechanism connected with the yokes for moving the yokes at one end of the blade towards an extended position while the yokes at the other end of the blade move towards a folded position and thus angularly adjust the blade.

2. A bulldozer attachment for a tractor comprising a frame of dimensions adapting it to straddle a tractor and having a cross bar for extending across the front end of the tractor and rearwardly extending side bars adapted to be pivoted at their rear ends to opposite sides of the tractor and mount the frame for vertical swinging movement to raised and lowered positions, ends of the cross bar being pivoted to front ends of the side bars for movement about a horizontal axis, means for independently swinging the side bars vertically and effecting movement of the cross bar transversely of the tractor to angularly adjusted positions, a blade extending transversely of the frame, in front of the cross bar, upper and lower bearing plates projecting forwardly from the cross bar midway of the length thereof, upper and lower ears extending rearwardly from said blade midway of the length thereof and disposed between the bearing plates, pins passing vertically through companion upper and lower bearing plates and ears and mounting the blade for horizontal swinging movement to angularly adjusted positions, companion front and rear yokes pivoted to each other and to ends of the blade and the cross bar, and hydraulic operating means mounted between the bearing plates and connected with the yokes for moving the yokes and adjusting the blade.

3. A bulldozer attachment for a tractor comprising a frame of dimensions adapting it to straddle a tractor and having a cross bar for extending across the front end of the tractor and rearwardly extending side bars adapted to be pivoted at their rear ends to opposite sides of the tractor and mount the frame for vertical swinging movement to raised and lowered positions, ends of the cross bar being pivoted to front ends of the side bars for movement about a horizontal axis, means for independently swinging the side bars vertically and effecting movement of the cross bar transversely of the tractor to angularly adjusted positions, a blade extending transversely of the frame, in front of the cross bar, upper and lower bearing plates projecting forwardly from the cross bar midway of the length thereof, upper and lower ears extending rearwardly from said blade midway of the length thereof and disposed between the bearing plates, pins passing vertically through companion upper and lower bearing plates and ears and mounting the blade for horizontal swinging movement to angularly adjusted positions, companion front and rear yokes pivoted to each other and to ends of the blade and the cross bar, a cylinder extending transversely of said frame disposed between the bearing plates and pivotally mounted for movement about a vertical axis by pins passing through the said bearing plates, a rod passing longitudinally through said cylinder and projecting from opposite ends thereof, a piston carried by said rod within the cylinder and acted upon by fluid in the cylinder to shift the bar longitudinally, and links having inner ends pivotally connected with ends of said bar for horizontal swinging movement and having outer ends pivotally connected with the front and rear yokes for swinging the yokes at one side of the frame inwardly and the yokes at the other sides of the frame outwardly when the bar is shifted longitudinally and thereby move the blade about its vertical axis to angularly adjusted positions.

JOHN W. MERZ.

References Cited in the file of this patent

UNITED STATES PATENTS

| Number | Name | Date |
|---|---|---|
| 910,384 | Ireland | Jan. 19, 1909 |
| 2,064,022 | Maloon | Dec. 15, 1936 |
| 2,075,482 | Thorpe | Mar. 30, 1937 |
| 2,160,595 | Le Bleu | May 30, 1939 |
| 2,173,158 | Corbett | Sept. 19, 1939 |